US00RE38172E

(19) United States
(12) Reissued Patent
Revenaugh et al.

(10) Patent Number: US RE38,172 E
(45) Date of Reissued Patent: Jul. 8, 2003

(54) GRAND PIANO HAVING A LOWER LID

(76) Inventors: Daniell Revenaugh, 2351 Etna St., Berkeley, CA (US) 94704; John Meyer, 928 Arlington Ave., Berkeley, CA (US) 94707

(21) Appl. No.: 09/741,784

(22) Filed: Dec. 20, 2000

Related U.S. Patent Documents

Reissue of:
(64) Patent No.: 5,301,588
Issued: Apr. 12, 1994
Appl. No.: 07/843,291
Filed: Feb. 28, 1992

(63) Continuation of application No. 09/045,482, filed on Mar. 20, 1998, now abandoned, which is a continuation of application No. 08/354,942, filed on Dec. 13, 1994, now abandoned.

(51) Int. Cl.[7] ..... G10C 3/02
(52) U.S. Cl. ..... 84/177; 84/174; 84/281; 84/182
(58) Field of Search ..... 84/174, 177, 182, 84/189, 190–192, 207–209, 281

(56) References Cited

U.S. PATENT DOCUMENTS

| | | | | | |
|---|---|---|---|---|---|
| 390,169 | A | * | 9/1888 | Hudson | 84/189 |
| 890,443 | A | * | 6/1908 | Norcross | 84/178 |
| 2,134,680 | A | * | 11/1938 | Beck | 84/189 |
| 2,138,669 | A | * | 11/1938 | Tower | 84/189 |
| 4,211,142 | A | * | 7/1980 | Conklin, Jr. | 84/189 |
| 5,020,632 | A | * | 6/1991 | Nelson | 181/290 |

FOREIGN PATENT DOCUMENTS

| | | |
|---|---|---|
| DE | 504518 | 7/1930 |
| JP | 152582 | 11/1980 |
| JP | 1-136190 | 5/1989 |

OTHER PUBLICATIONS

English language Translation from German of German Patent Specification No. 504518, 3 pages, Publication date of the granting of the patent Jul. 24, 1930.

* cited by examiner

*Primary Examiner*—Shih-Yung Hsieh
(74) *Attorney, Agent, or Firm*—Cowan Liebowitz & Latman, P.C.; Mark Montague

(57) ABSTRACT

A grand piano having a lower lid attached thereto by hinges, and a lid designed for attachment to the bottom of a grand piano. The lid completely covers the bottom of the piano case when latched in a closed position. In its closed position, the lower lid protects the soundboard from damage (such as during transportation of the piano) and mutes the piano's sound. The lower lid of the invention is designed so that, when released from its closed position and pivoted downward into an open position, it will reflect sound from the soundboard outward from the front of the piano. Preferably, the angular orientation of the lower lid in its open position is chosen to reinforce and focus the projection of sound within a desired frequency range (for example, midrange sounds) to a desired target region. Such optimal angular orientation can be determined experimentally. In one embodiment, the lower lid consists of two or more panels connected together by hinges, so that it can be detached from the piano and folded into a compact volume for convenient handling and storage. The dimensions of the lid and the positions of hinges which connect its panels are preferably predetermined so that lid has an optimal orientation for reinforcing projection of midrange sounds (or sounds within another desired frequency range) in a typically-sized room or concert hall when the lid is lowered to an open position in which it rests on the floor.

28 Claims, 3 Drawing Sheets

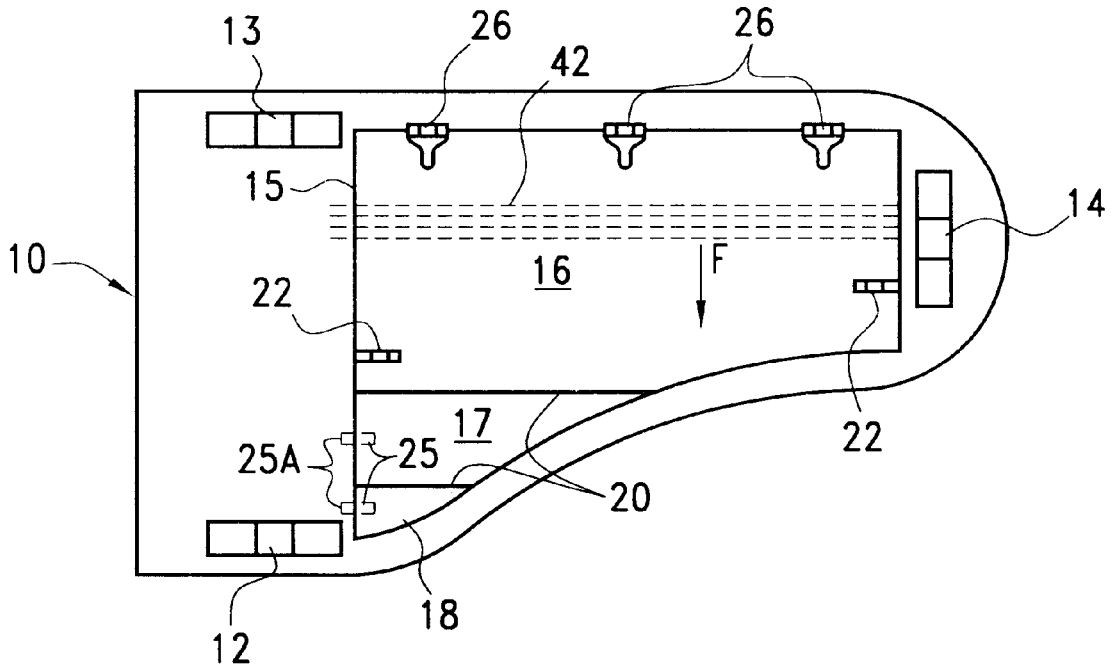
FIG. 1
AMENDED

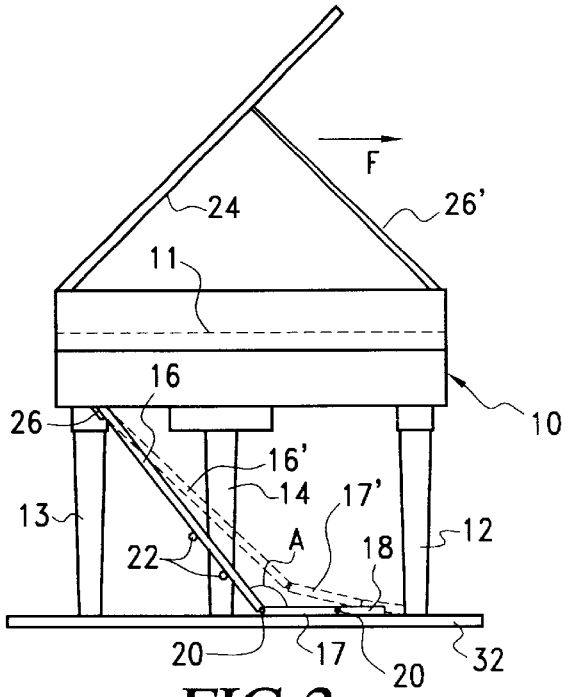
FIG.2
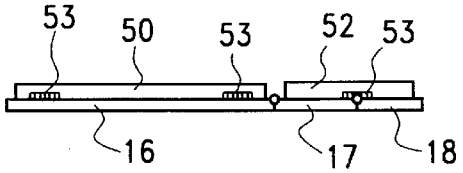
FIG.4
FIG.3
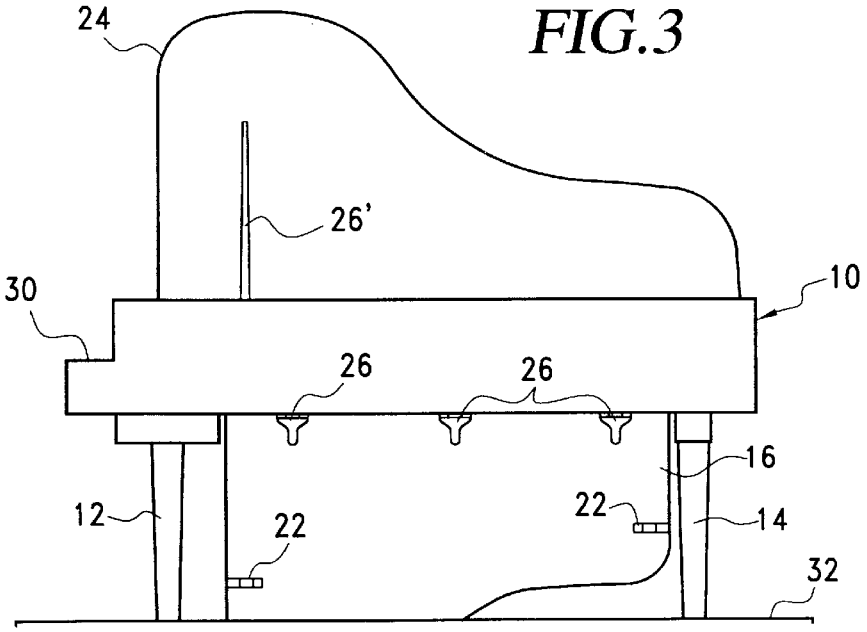

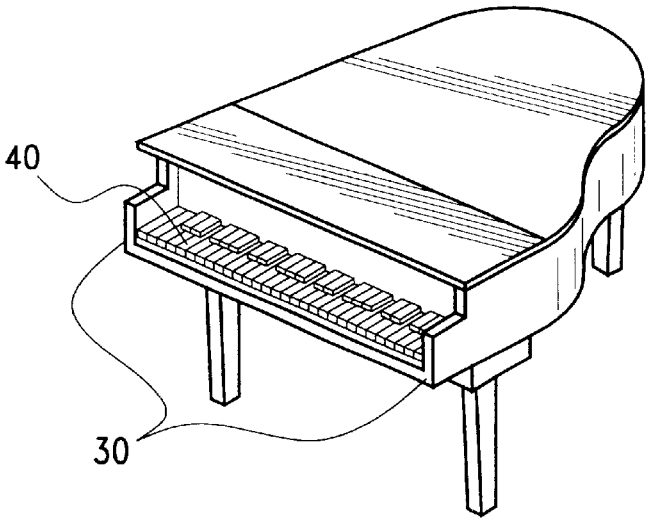
FIG.5
(NEW)
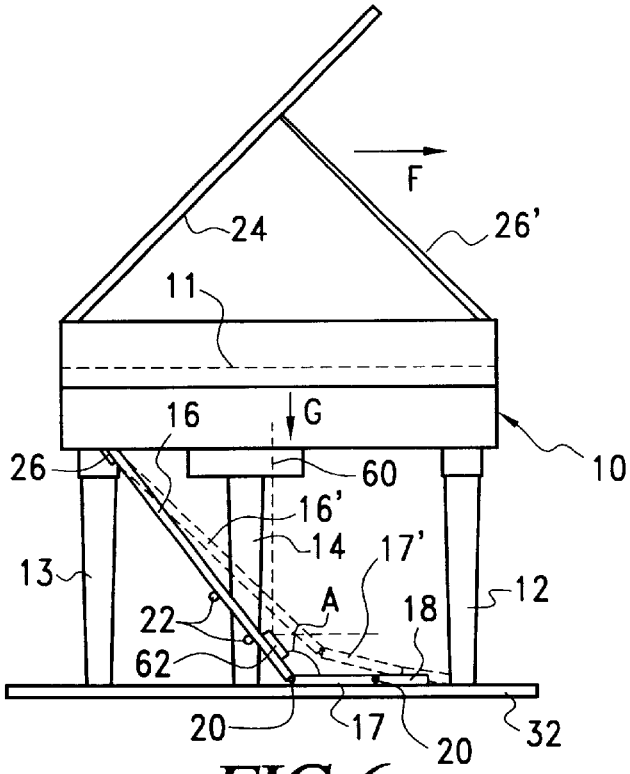
FIG.6
(NEW)

GRAND PIANO HAVING A LOWER LID

Matter enclosed in heavy brackets [ ] appears in the original patent but forms no part of this reissue specification; matter printed in italics indicates the additions made by reissue.

*RELATED APPLICATIONS*

*This is a continuation of application Ser. No. 09/045,482, filed Mar. 20, 1998, abandoned, which is a continuation of application Ser. No. 08/354,942, filed Dec. 13, 1994, abandoned, for Reissue of U.S. Pat. No. 5,301,588, issued Apr. 12, 1994, based on application Ser. No. 07/843,291, filed Feb. 28, 1992.*

FIELD OF THE INVENTION

The invention pertains to a lower lid for a grand piano, and to a grand piano having a lower lid. More particularly, the invention pertains to a hinged lid, and to a grand piano having a hinged lower lid.

BACKGROUND OF THE INVENTION

The primary sound radiating component of a grand piano is its soundboard. The soundboard is horizontally oriented within the piano's case. The bottom of a conventional grand piano is open, so that sound can radiate downward from the soundboard directly to the surface on which the piano rests.

A conventional grand piano has a hinged cover (to be referred to herein as a "top lid") which can be raised into an open position. When the top lid is propped in its open position, sound radiating upward from the soundboard is reflected by the top lid toward the front side of the piano (the curved side of the piano, which is on the right side of a pianist facing the keyboard).

U.S. Pat. No. 4,211,142, issued to Conklin, discloses attachment of a large bottom panel below the soundboard of a grand piano to reflect sound propagating downward from the soundboard toward the rear side of the piano. Conklin's panel reflects sound in the opposite direction than the top lid of the piano to which it is attached. Conklin suggests that the bottom panel can be convex so as to reflect sound toward the ends of the piano (toward the keyboard and away from the keyboard) as well as toward the rear side of the piano. Conklin's bottom panel has hinges 22 along one edge, and Conklin teaches that the hinges can be attached to the piano case, or to brackets connected to the piano case, to enable the panel's free edge to be raised by a cable or chain 25 slightly above floor level during transportation of the piano.

U.S. Pat. No. 2,138,669, issued to Tower, discloses a tone deflector for a grand piano, which consists of a set of slanting vanes 13 fixedly mounted to the piano case under the soundboard. Tower teaches that some or all of the vanes can be mounted in orientations for deflecting sound toward the piano's rear side, and that some or all of the vanes can be mounted in orientations for deflecting sound toward the piano's front side. However, Tower's vanes are very small, and would not have sufficient surface area to project sound efficiently outward from the soundboard. The small size of Tower's vanes would also prevent them from being oriented at the proper angle for projecting sound efficiently outward from the soundboard to typical target areas.

Until the present invention, however, it had not been proposed that a grand piano be provided with a hinged lower lid completely covering the bottom of the piano's case when closed (to protect the soundboard and mute the piano's sound). Nor had it been proposed until the present invention that such a lower lid be lowered into an open position to which it reinforces and focuses the projection of midrange sounds outward from the front of the piano.

SUMMARY OF THE INVENTION

The invention is a grand piano having a lower lid attached thereto by hinges, and a lid for attachment to the bottom of a grand piano. Preferably, the lid is sized and shaped to completely cover the bottom of the piano case when latched in a closed position. In its closed position, the lower lid protects the soundboard from damage (such as during transportation of the piano) and mutes the piano's sound. Such muting action is desirable, for example, when the piano is used in small room (such as a practice room), or when the piano resides on an upper level of a multi-level building (such as an apartment house) where it is necessary to minimize projection of sound from the piano to lower levels of the building.

The lower lid of the invention is designed so that, when released from its closed position and pivoted downward into an open position, it will reflect sound from the soundboard outward from the front of the piano. Preferably, the angular orientation of the lower lid in its open position is chosen to reinforce and focus the projection of sound within a desired frequency range (for example, midrange sounds) to a desired target region.

Such optimal angular orientation can be determined experimentally. In one embodiment, the optimal lid orientation for reinforcing projection of midrange sounds is determined as follows. A light beam (which can be a laser beam) is directed downward from the midpoint of the soundboard to a flat mirror which rests flat against the open lower lid, while the angle of the open lower lid is varied until the light beam reflects from the mirror to the desired target region (which can be, for example, a particular seat or row of seats in a concert hall). To reinforce projection of non-midrange sounds, the light beam should be directed downward from a point on the soundboard other than the midpoint.

In one embodiment, the lower lid of the invention consists of two or more panels connected together by hinges. In this embodiment, the lower lid can be detached from the piano and folded into a compact volume for convenient handling and storage. The dimensions of the lid, and the positions of hinges which connect its component panels, are preferably predetermined so that lid has an optimal orientation for reinforcing projection of midrange sounds in a typically-sized room or concert hall, when the lid is lowered to an open position in which it rests on the floor.

The lower lid of the invention can be fitted with one or more removable sound-absorbing pads (composed of styrofoam or another sound-absorbing material). Such pads will enhance the muting action of the lower lid in its closed position, and can be removed when the lid is lowered into its open position.

BRIEF DESCRIPTION OF THE DRAWINGS

FIG. 1 is a bottom view of a grand piano including a preferred embodiment of the inventive lower lid, shown fastened in a closed position closing the bottom of the piano's case.

FIG. 2 is an elevational view of the grand piano of FIG. 1 from the piano's keyboard end, with the lower lid lowered into an open position.

FIG. 3 is a front elevational view of the grand piano of FIG. 2, with the lower lid lowered into an open position.

FIG. 4 is a side cross-sectional view of an embodiment of the lower lid of the invention fitted with a removable muting pad.

*FIG. 5 is a perspective view of a grand piano.*

*FIG. 6 is an elevational view of a grand piano in an embodiment having a light beam and a flat mirror disposed on the lower lid.*

DETAILED DESCRIPTION OF THE PREFERRED EMBODIMENTS

A preferred embodiment of the invention will be described with reference to FIGS. 1–3 *and 5*.

In this embodiment, grand piano case 10 is supported by legs 12, 13, and 14 above floor 32. As shown in FIG. 2, when top lid 24 of case 10 is propped open in a raised position by support 26', sound propagating upward from *strings 42* (*shown in phantom view in FIG. 1*) *supported on* soundboard 11 (shown in phantom view *in FIG. 2*) within case 10 is reflected by top lid 24 in the forward direction (i.e., in the general direction of arrow F in FIG. 2).

This forward direction is the direction from rear leg 13 toward front leg 12 (represented by arrow F in FIG. 1). To a pianist (not shown) seated facing keyboard 30 *having a set of keys 40* (*FIG. 5*), the forward direction would be the direction toward his or her right side.

In the embodiment of FIGS. 1–3, the lower lid of the invention consists of flat panels 16, 17, and 18. Panel 16 is connected to panel 17 by a first piano hinge 20, and panel 17 is connected to panel 18 by another piano hinge 20. Panel 16 is connected to the rear side of case 10 by hinges 26. Panels 16–18 are constructed from hard material capable of reflecting sound, such as plywood.

Case 10 has an open bottom 15, as does any conventional grand piano case. Panels 16–18 are sized and shaped to completely cover open bottom 15 when fastened in the closed position shown in FIG. 1 (in variations on the FIG. 1 design, the inventive lower lid may substantially cover the piano's bottom opening without completely covering it). As shown in FIG. 1, panel 16 is fastened to case 10 by hinges 26 and latches 22, and each of panels 17 and 18 are fastened to case 10 by a removable dowel 25. Each dowel 25 is inserted into a hole 25a in case 10 to constrain panel 17 (or 18) in a closed position covering open bottom 15. Dowels 25 are removed from holes 25a to release panels 17 and 18 from the closed position.

Because panels 16–18 cover open bottom 15 when constrained in their closed position, the lower lid of the invention protects the piano's soundboard from damage (such as during transportation of the piano) and mutes the piano's sound.

Grand pianos, especially the large-sized concert models, produce more output than is desirable for use in rooms smaller than a typical concert hall. For this reason, the muting action provided by the inventive lower lid in its closed position is desirable when a grand piano is used in a small room (such as one of the small, resonant rooms often employed as practice rooms in music conservatories and the like). The muting action would also be desirable when the piano resides on an upper level of a multi-level building (such as an apartment house), where it is necessary to minimize projection of sound from the piano (through the floor which supports it) to lower levels of the building.

When panels 16–18 are released from their closed position by removing dowels 25 and releasing latches 22, panel 16 can be pivoted downward about hinges 26 into the open position shown in FIGS. 2 and 3. To allow panel 16 to reach this open position, panels 17 and 18 pivot about hinges 20 until they rest on floor 32. In the open position, panel 16 is oriented at an angle A with respect to floor 32, and will reflect sound that has propagated downward from soundboard 11 and outward from the front of the piano (i.e., panel 16 will reflect the sound outward from the front of the piano in the general direction of arrow F).

Since panels 16–18 are hingedly connected to case 10 and to each other, they can be pivoted to orient panel 16 at any of a variety of angles relative to the floor. For example, panel 16 can be moved into position 16' (shown in phantom view in FIG. 2) if panel 17 is moved into position 17' (also shown in phantom view in FIG. 2). In position 17', panel 17 is inclined relative to floor 32, and both panels 16 and 17 will reflect sound in forward directions (generally parallel to arrow F).

Preferably, in the open position of the lower lid, panels 16–18 (and especially the largest panel 16, which is the primary sound reflector) are oriented so as to reinforce the projection of sound within a desired frequency range (for example, midrange sounds) to a desired target region. Such optimal angular orientation can be determined experimentally. For example, a listener at the target region can listen to sound projected from the piano with panels 16–18 in a number of different orientations. In this way, the listener can identify the panel orientation which optimally reinforces the desired frequency range of projected sound.

The optimal panel orientation for reinforcing projection of midrange sounds (or sounds in any other desired range) can also determined as follows. [To] *As shown in FIG. 6, to* reinforce projection of midrange sounds, a light beam *60* (which can be a laser beam) is directed downward *in the direction of arrow G* from the midpoint of soundboard 11 onto a flat mirror *62* resting flat against panel 16. The angle of panel 16 is then varied until the light beam *60* reflects from the mirror *62* to the desired target region (which can be, for example, a particular seat or row of seats in a concert hall), and the corresponding panel orientation is identified as being optimal.

To reinforce projection of non-midrange sounds, the light beam would be directed downward from a point on the soundboard appropriate to the range to be projected. Specifically, the light beam would be directed downward, from a zone of the soundboard vertically displaced from the piano strings *42* producing the sounds to be projected, to a mirror resting on panel 16. The panel would then be varied until the light beam reflects from the mirror to the desired target region.

In variations on the embodiment of FIGS. 1–3, the lower lid of the invention can consist of less than three or more than three panels connected together by hinges (each hinge is preferably an elongated piano hinge such as hinges 20 of FIG. 1). In embodiments in which the lower lid consists of several panels (each of which is preferably small in size), the lower lid can be detached from the piano and its component panels folded together into a compact volume for convenient handling and storage. Of course, all the component panels of the lower lid should be shaped so that they will collectively cover the piano case's open bottom 15 when fastened in their closed position.

The dimensions (i.e., width) of each panel of the inventive lower lid, and thus the positions of the hinges which connect them, are preferably predetermined so that lid can be readily positioned in an optimal orientation for reinforcing projection of midrange sounds (or sounds in another desired range) in a typically-sized room or concert hall. For example, the relative dimensions of panels 16, 17, and 18 in the embodiment of FIGS. 1–3, are preferably chosen so that when both panels 17 and 18 lie flat on the floor (as in FIG. 2), panel 16 is oriented (at an optimal angle A relative to the floor) for optimally reinforcing projection of midrange sounds in a typically-sized room or concert hall. Any convenient means can be employed for supporting the panels in their optimal orientation when the lower lid is in its open position.

In alternative embodiments of the invention, the lower lid can be fitted with one or more removable sound-absorbing pads (composed of styrofoam or some other sound-absorbing substance). Such pads will enhance the muting action of the lower lid when the lower lid is raised in its closed position, and can be removed when the lid is lowered into its open position. For example, as shown in FIG. 4, a first sound absorbing pad 50 is removably attached by Velcro fasteners 53 (or the like) to panel 16's upper surface (the surface facing the soundboard), and a second sound absorbing pad 52 is removably attached by a Velcro fastener 53 (or the like) to the upper surface of panels 17 and 18.

Various modifications and alterations in details of design and construction of the invention will be apparent to those skilled in the art without departing from the scope of the invention. Although the invention has been described in connection with specific preferred embodiments, it should be understood that the invention as claimed should not be unduly limited to such specific embodiments.

What is claimed is:

[1. A grand piano, including:

a case having an open bottom and a top lid;

a means for supporting the top lid in an open position in which the top lid reflects sound from within the case into a forward direction;

a lower lid;

a hinge means connecting the lower lid to the case so that the lower lid is free to pivot relative to the hinge means into an open position in which the lower lid reflects sound from within the case into the forward direction; and a means for constraining the lower lid in a closed position substantially completely closing the open bottom, and releasing the lower lid from the closed position so that the lower lid is free to pivot about the hinge means into the open position.]

2. [The] *A* grand piano, *including:* [of claim 1, wherein the lower lid includes:]

*a case having an open bottom and a top lid;*

*a means for supporting the top lid in an open position in which the top lid reflects sound from within the case into a forward direction;*

*a lower lid;*

*a hinge means connecting the lower lid to the case so that the lower lid is free to pivot relative to the hinge means into an open position in which the lower lid reflects sound from within the case into the forward direction;*

*a means for constraining the lower lid in a closed position substantially completely closing the open bottom, and releasing the lower lid from the closed position so that the lower lid is free to pivot about the hinge means into the open position, wherein the lower lid includes:* at least two panels; including a first panel and a second panel; [and]

a hinge connecting the first panel to the second panel*; and*

*a sound-absorbing pad attached to the lower lid for muting sound radiating in the downward direction when the lower lid is in the closed position.*

3. The grand piano of claim 2, wherein at least one of the panels has an inclined orientation relative to a horizontal plane when the lower lid is in the open position, and wherein the inclined orientation reinforces the projection of sound within a desired frequency range to a desired target region.

4. The grand piano of claim 3, wherein the sound within said desired frequency range is midrange sound.

5. The grand piano of claim 2, wherein the piano rests on a floor, wherein the panels are dimensioned so that a first one of the panels rests flat on the floor and a second one of the panels is oriented at a first angle relative to the floor when the lower lid is in the open position, and wherein sound reflection from the second one of the panels reinforces projection of sound within a desired frequency range to a desired target region when the lower lid is in the open position.

[6. The grand piano of claim 1, wherein the case has holes for receiving dowels, and wherein the means for constraining the lower lid includes dowels dimensioned for removable insertion in the holes.]

[7. The grand piano of claim 6, wherein the means for constraining the lower lid also includes latches mounted on the lower lid.]

8. [The] *A* grand piano [of claim 1,] *including:*

*a case having an open bottom and a top lid;*

*a means for supporting the top lid in an open position in which the top lid reflects sound from within the case into a forward direction;*

*a lower lid;*

*a hinge means connecting the lower lid to the case so that the lower lid is free to pivot relative to the hinge means into an open position in which the lower lid reflects sound from within the case into the forward direction; and*

*a means for constraining the lower lid in a closed position substantially completely closing the open bottom, and releasing the lower lid from the closed position so that the lower lid from the closed position so that the lower lid is free to pivot about the hinge means into the open position,* wherein the lower lid has at least one sound-absorbing pad removably attached thereto, wherein the sound-absorbing pad mutes sound produced by the grand piano when the lower lid is in the closed position, and wherein the pad can be removed from the lower lid when the lower lid is in the open position.

9. A grand piano having a soundboard enclosed within a case, wherein the case has a front side, a rear side, and an open bottom, including:

a top lid connected to the rear side of the case for reflecting sound outward from the front side of the case;

a set of hinged panels; [and]

means for releasably constraining the panels in a closed position in which the panels completely close the open bottom, including a first set of hinges which connect a largest one of the panels to the rear side of the case*; and*

*a sound-absorbing pad attached to at least one of the hinged panels for muting sound radiating in the downward direction when the panels are in the closed position.*

10. The grand piano of claim 9, wherein the means for releasably constraining the panels includes means for releasing the panels from the closed position so that said panels are free to pivot about the first set of hinges into an open position.

11. The grand piano of claim 10, wherein the largest one of the panels has an inclined orientation relative to the soundboard in the open position, and wherein the inclined orientation reinforces the projection of sound within a desired frequency range from the soundboard to a desired target region.

12. The grand piano of claim 11, wherein the sound within said desired frequency range is midrange sound.

13. The grand piano of claim 10, wherein the piano rests on a floor, and in the open position, the largest one of the panels is oriented at a first angle relative to the floor and a second one of the panels rests flat on the floor.

14. The grand piano of claim 13, wherein the first angle is such that sound reflection from the largest one of the panels reinforces projection of sound within a desired frequency range to a desired target region.

15. The grand piano of claim 9, wherein the case has holes for receiving dowels, and wherein the means for releasably constraining the panels includes dowels dimensioned for removable insertion in the holes.

16. The grand piano of claim 15, wherein the means for releasably constraining the panels also includes latches mounted on the largest one of the panels.

17. A method of reinforcing projection of sounds within a desired frequency range from a grand piano to a desired target region, wherein the grand piano has a horizontal soundboard and a lower lid hingedly attached to the piano below the soundboard, including the steps of:

(a) directing a light beam downward from the soundboard to a mirror resting on the lower lid; and (b) varying the angle of the lower lid relative to the soundboard while performing step (a), until the light beam reflects from the mirror to the desired target region.

18. The method of claim 17, wherein the sounds within the desired frequency range are midrange sounds, and wherein the light beam is downward from the midpoint of the soundboard during step (a).

19. A lower lid for a grand piano having a case with an open bottom and a top lid, wherein the lower lid has a size and shape sufficient to cover the open bottom of the case substantially completely, and wherein the lower lid includes:

a first panel having size and shape sufficient to cover a first portion of the open bottom of the case;

a second panel having size and shape sufficient to cover a second portion of the open bottom of the case; [and]

a first hinge connecting the first panel to the second panel*; and*

*a mirror coupled to one of the first and second panels for directing a light beam to establish an angle of the lower lid to reinforce projection of sounds from the grand piano to a desired target region.*

20. The lid of claim 19, also including:

a hinge means attached to the first panel for hingedly connecting the first panel to the case.

21. The lid of claim 19, also including:

a sound-absorbing pad removably attached to one side of the first panel.

22. The lid of claim 21, also including:

a second sound-absorbing pad removably attached to one side of the second panel.

23. The lid of claim 19, also including:

a third panel having size and shape sufficient to cover a third portion of the open bottom of the case; and a second hinge connecting the third panel to the second panel.

24. The lid of claim 23, wherein the first panel, the second panel, the third panel, the first hinge, and the second hinge, together completely cover the open bottom of the case.

*25. A lower lid assembly for a grand piano, said grand piano including a case having an open bottom and a top lid, a soundboard within the case, capable of radiating sound, and a means for supporting the top lid in an open position in which the top lid reflects one portion of the sound radiated from the soundboard into a forward direction, said lower lid assembly including:*

*a lower lid;*

*a means for positioning the lower lid in an open position relative to the case, in which the lower lid reflects another portion of the sound radiated from the soundboard into the forward direction while the top lid reflects said one portion of the sound into the forward direction, wherein the lower lid includes:*

*at least two panels, including a first panel and a second panel;*

*a hinge connecting the first panel to the second panel; and*

*a mirror coupled to the lower lid for directing a light beam to establish an angle of the lower lid to reinforce projection of sounds from the grand piano to a desired target region.*

*26. The lower lid assembly of claim 25, wherein the lower lid includes:*

*a third panel; and*

*a second hinge connecting the third panel to the second panel.*

*27. The lid of claim 26, wherein the first panel, the second pane, the third pane, the first hinge, and the second hinge, together completely cover the open bottom of the case.*

*28. A method of projecting sounds from within a grand piano, said grand piano including a case having an open bottom and a top lid, a soundboard oriented substantially horizontally within the case, and capable of radiating sound, and a means for supporting the top lid in an open position in which the top lid reflects one portion of the sound radiated from the soundboard into a forward direction, said method including the steps of:*

*(a) positioning a lower lid below the soundboard in such an orientation that the lower lid reflects another portion of the sound radiated from the soundboard into the forward direction while the top lid reflects said one portion of the sound in to the forward direction;*

*(b) directing a light beam downward from the soundboard to a mirror resting on the lower lid; and*

*(c) varying the angle of the lower lid relative to the soundboard while performing step (b), until the lower lid is in a final orientation such that the light beam reflects from the mirror to a desired target region, whereby the lower lid in said final orientation reinforces projection of sounds within a desired frequency range from the grand piano to the desired target region.*

*29. The method of claim 28, wherein the sounds within the desired frequency range are midrange sounds, and wherein the light beam is directed downward from the midpoint of the soundboard during step (b).*

*30. A grand piano, including:*

*a case having an open bottom and an open top;*

*a keyboard disposed within the case and having a set of keys;*

*a soundboard mounted within the case and adapted to produce a sound upon depression of one of said keys,*

*a portion of said sound produced by said soundboard radiating in an upward direction and a portion of said sound radiating in a downward direction;*

*a top lid supported on said case in an open position and adapted to reflect said portion of said sound radiating in the upward direction into a forward direction;*

*a lower lid disposed below said case in an open position and adapted to reflect said portion of said sound radiating in the downward direction into the forward direction;*

*the lower lid being adapted to move between the open position and a closed position, the lower lid substantially closing the open bottom of the case in the closed position;*

*the lower lid including a sound-absorbing pad attached thereto for muting the portion of the sound radiating in the downward direction when the lower lid is in the closed position.*

*31. A grand piano, including:*

*a case having an open bottom and an open top;*

*a keyboard disposed within the case and having a set of keys;*

*a soundboard mounted within the case and adapted to produce a sound upon depression of one of said keys, a portion of said sound produced by said soundboard radiating in an upward direction and a portion of said sound radiating in a downward direction;*

*a top lid supported on said case in an open position and adapted to reflect said portion of said sound radiating in the upward direction into a forward direction;*

*a lower lid disposed below said case in an open position and adapted to reflect said portion of said sound radiating in the downward direction into the forward direction;*

*the lower lid including first and second panels and a hinge, the hinge connecting the first panel to the second panel; and*

*a mirror coupled to the lower lid for directing a light beam to establish an angle of the lower lid to reinforce projection of sounds from the grand piano to a desired target region.*

* * * * *